Patented June 8, 1937

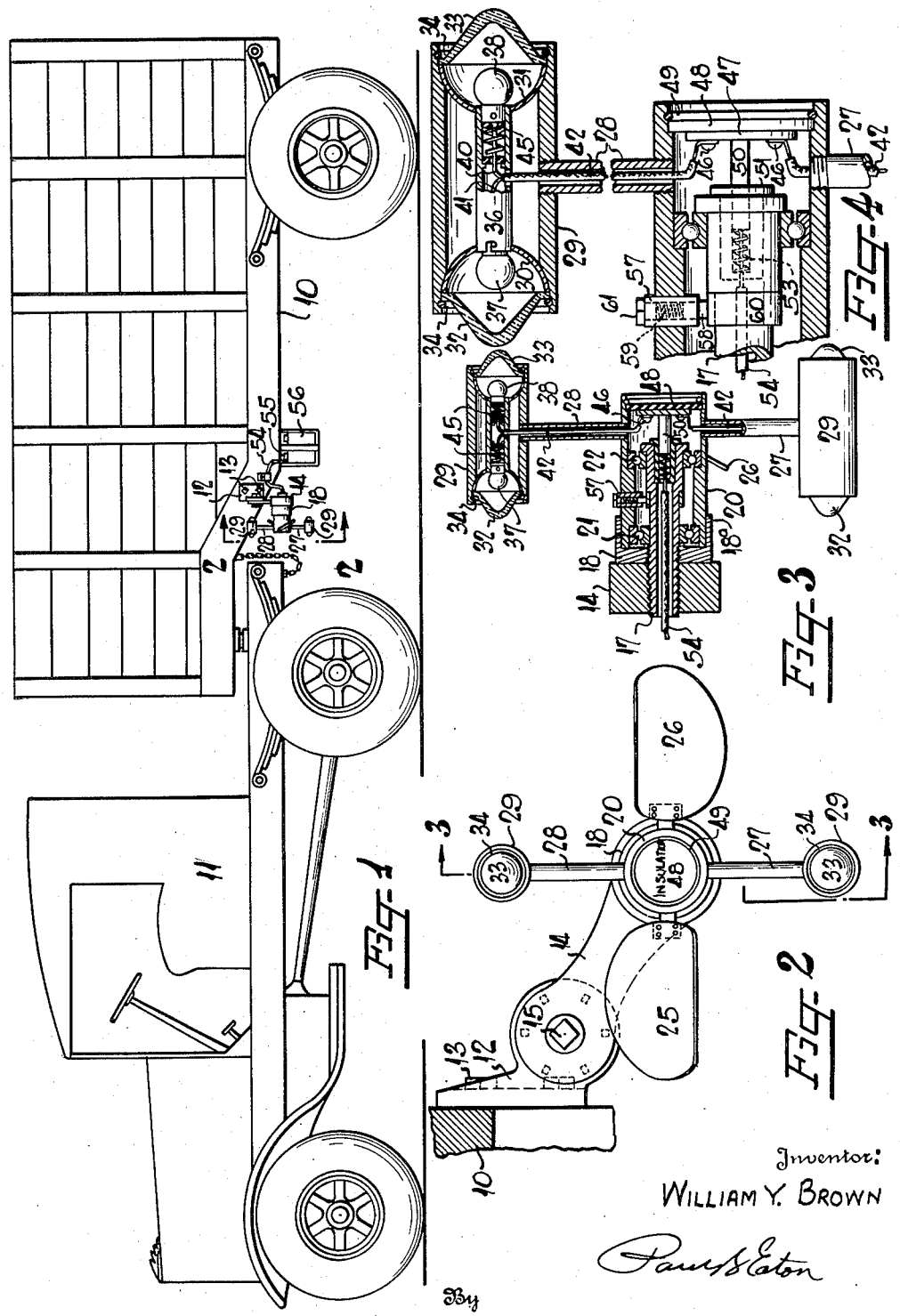

2,082,778

UNITED STATES PATENT OFFICE 2,082,778

VEHICULAR SIGNAL

William Y. Brown, Charlotte, N. C., assignor of one-third to William C. Honeycutt, Black Mountain, N. C., and one-third to Robert H. Garland, Charlotte, N. C.

Application June 10, 1936, Serial No. 84,529

3 Claims. (Cl. 177—329)

This invention relates to a traffic signal carried by vehicles such as automobiles, trucks and the like, and more especially to a signal comprising one or more lights mounted for rotation and which are revolved by the air currents produced by the forward speed of the vehicle. It is a well known fact that a moving signal will attract more attention than the stationary signals and therefore, if a suitable device can be designed whereby the speed of a revolving signal will indicate the corresponding speed of the automobile or vehicle upon which it is mounted a greater protection can be provided for the vehicle upon which it is installed as well as for approaching drivers.

It is therefore, an object of this invention to provide a revolving signal which is revolved or rotated by the air currents produced by the forward speed of the vehicle, said signal having an illuminating means visible both from the front and the rear of the vehicle for giving notice to the drivers meeting, following or overtaking the vehicle.

It is a further object of this invention to provide a rotating signal of the class described being adjustably mounted on the side of a vehicle so that the position of the same may be varied with respect to the body of the vehicle to afford the desired view from the front and rear of the vehicle so equipped.

It is still a further object of this invention to provide an air-propelled signal of the class described, said signal having means for propelling the same comprising fan blades connected to a suitable rotating hub, and a lighting means secured to said hub, independent of said fan blades, for giving the proper signal to drivers of vehicles following, overtaking or meeting the vehicle so equipped.

Some of the objects of the invention having been stated, other objects will appear as the description proceeds, when taken in connection with the accompanying drawing, in which:—

Figure 1 is a side elevation of a vehicle comprising a tractor and a trailer with the invention applied thereto;

Figure 2 is a sectional elevation taken along line 2—2 in Figure 1;

Figure 3 is a vertical sectional view taken along line 3—3 in Figure 2;

Figure 4 is an enlarged sectional view of the upper right-hand portion of Figure 3.

Referring more specifically to the drawing, the numeral 10 denotes a suitable trailer which is drawn by tractor 11. In a vehicle of this type, it has been found from experience that the most appropriate place for positioning a signal on the vehicle is approximately midway between the front and rear extremities of the vehicle in order that the signal may be visible at all times. For this reason, a suitable bracket 12 is secured to the side of trailer body 10, approximately midway of the combined length of the trailer 10 and tractor 11. This bracket is secured to the body by any suitable means such as bolts 13 and has adjustably secured thereto another bracket 14 by any suitable means such as bolt 15. By loosening bolt 15, the bracket 14 may be rotated to any desired position where the light will be visible to drivers of other vehicles both in front and rear of the vehicle so equipped.

Threadably secured in the free end of bracket 14 is a hollow pipe 17 which pipe is locked in position in the end of bracket 14 by means of a lock nut 18 which is also threadably mounted on pipe 17. Mounted on pipe 17 and positioned between this pipe and the casing or hub 20 are ball bearings 21 and 22, which bearings allow the hub 20 to rotate around the pipe 17. It will be noted that lock nut 18 has a flange or sleeve 18a which extends over the left-hand portion of hub 20 (Fig. 3), in order to prevent sand, grit, water and the like from entering the interior of said hub.

Hub 20 has projecting from opposed sides thereof propeller blades 25 and 26. Also projecting from opposed sides of the hub and at approximately right angles to the propeller blades 25 and 26 are hollow pipes 27 and 28, each of said pipes having secured on its extremity a casing 29. Since both of these casings and the contents therein are identical only one will be described and like reference characters will be given to like parts in the other casing.

Casing 29 has reflectors 30 and 31 mounted in the ends thereof which are held in position by glass shields or windows 32 and 33 respectively, which shields prevent foreign objects from entering into the inside of the casing and also allow the light rays to pass therethrough and form a signal.

It is obvious that these signals may be of any desired color, however, it is preferable that the rear signal 32 be red and the front signal 33 be any suitable color such as green. The members 32 and 33 are held in position by expansion rings 34 which fit into suitable grooves in the ends of casings 29 and have portions thereof for projecting downwardly over the periphery of members 32 and 33 to hold the same in position.

Disposed between reflectors 30 and 31 is a tube 36 which is adapted to accommodate in the ends thereof suitable light bulbs 37 and 38. These light bulbs are supplied with current through branch wires 40 and 41, said wires being joined together into one common wire 42. The ends of wires 40 and 41 are normally held in contact with the ends of bulbs 37 and 38 by any suitable means such as compression springs 45, (Figures 3 and 4).

Wire 42 leads downwardly through the interior of pipe 28 and is connected as at 46 to conductive bar 47, said bar being secured to a non-conductive disk 48 which, in turn, is secured in the end of casing 20 by any suitable means such as expansion ring 49. The current is supplied to bar 47 through a brush 50, which is slidably mounted in a block of insulation 51. The block of insulation is secured in a bore in pipe 17 and has a cavity in the central portion thereof in which a compression spring 53 is adapted to fit and normally press brush 50 against the conductive bar 47. Leading from the brush 50 is a wire 54 which has its other end connected to a terminal 55 of a suitable source of energy such as a storage battery 56 which battery is supported by the lower portion of the trailer body 10.

The lighting element which is secured on the extremity of pipe 27 is identical in all respects to the lighting element on the extremity of pipe 28 and therefore, another description is not deemed necessary since like reference characters will apply to like parts.

In order to obtain a perfect ground for these lights a suitable tube 57 has been inserted in the casing 20 and within this tube a brush 58 is slidably mounted. A spring 59 normally forces the brush 58 into contact with a brass ring 60 which ring is secured around pipe 17. In order to normally hold spring 59 in position a cap 61 is secured in the upper end of pipe 57.

It is therefore seen that if the parts 27, 28, and 29 are not sufficient to form a perfect ground, that the connection of these parts with the hollow pipe 17 and hence to the body of the vehicle, will make the ground connection perfectly completed, and therefore, there will be no flickering of the lights due to an improper ground.

It is also evident that the speed of this fan can be increased or decreased by bending the blades 25 and 26 and therefore varying the angularity of the same. When the angularity has been properly adjusted it has been found in actual operation that the cruising speed of the automobile or vehicle will rotate the lights at the proper speed so as to cause the lights which are mounted in casing 29 to appear as a solid circle or band.

It has also been found that as the speed of the car decreases, the intensity of this band is decreased a corresponding amount and hence notice is given to persons in front of and in the rear of the vehicle as to the approximate speed of the vehicle. When the vehicle is being slowed down an approaching driver can easily tell because the intensity of the band produced by the rotating lights will be correspondingly decreased and the separate identity of each light can be ascertained even though the lights are rotating slowly.

In the drawing and specification there has been set forth a preferred embodiment of the invention, and although specific terms are used, they are used in a generic and descriptive sense only, and not for purposes of limitation, the scope of the invention being set forth in the appended claims.

I claim:

1. A traffic signal adapted to be carried by a vehicle to indicate to proximate drivers the approximate speed of the vehicle carrying the signal, comprising a hub member mounted longitudinally of the vehicle and exposed to air currents created by relative movement between the vehicle and the air through which it is traveling, said hub member having alternately disposed arms and fan blades projecting radially therefrom, the arms having a source of illumination on the outer ends thereof visible from both the front and rear of the vehicle carrying the same, and said fan blades being radially and angularly disposed so as to impart the desired speed of rotation to the hub member.

2. A rotary signal for a vehicle, means for mounting the same for rotation in the air stream created by movement of the vehicle, said signal comprising a rotary hub member and at least one arm projecting laterally from said hub member, a tubular member disposed on the outer end of said arm and having a source of light disposed in each end of the tubular member, and fan blades mounted on the hub member for engaging the air through which the body of the vehicle is moved to impart rotation to the signal at a speed in proportion to the speed of the vehicle carrying the signal.

3. A rotary traffic signal having means for securing the same to the side of a vehicle, said signal comprising a hub member, arms carried by said hub member, illuminated means disposed on the outer ends of said arms on both the front and rear surfaces of said arms, and an airscrew also disposed on said hub member for imparting rotation to the hub member and the illuminated means when the vehicle is in motion.

WILLIAM Y. BROWN.